May 24, 1938.  A. J. CORLEY  2,118,496
FEEDING MECHANISM FOR SAWMILLS
Filed March 9, 1936
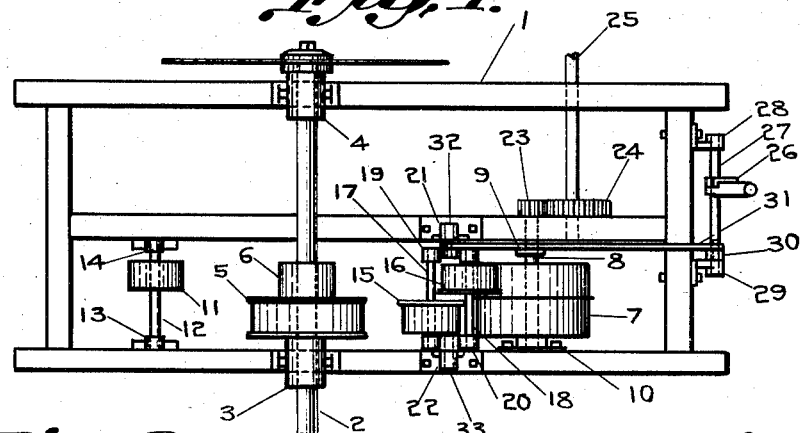
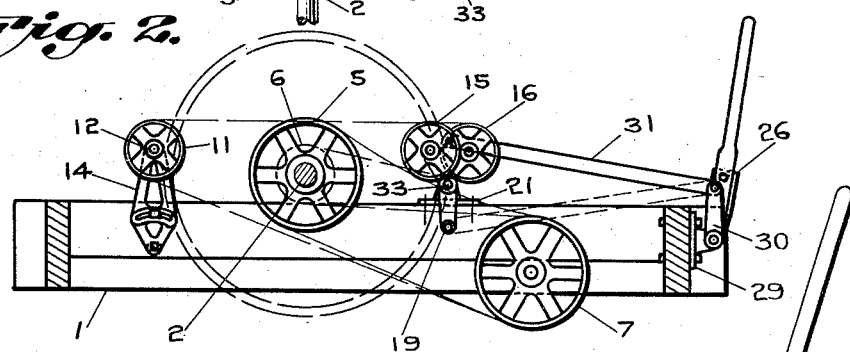
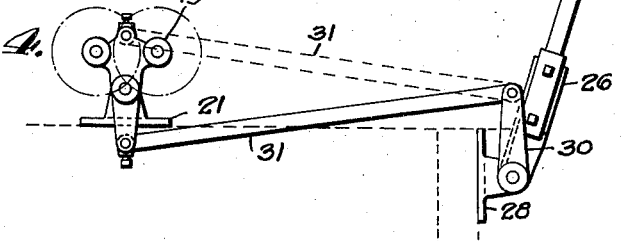
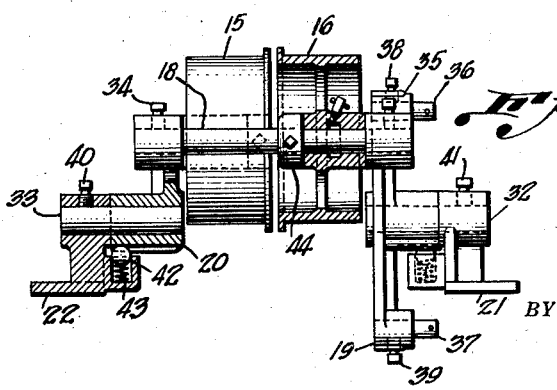
ANDREW J. CORLEY
*INVENTOR*
BY *Carmack Waterhouse*
*ATTORNEY*

Patented May 24, 1938

2,118,496

UNITED STATES PATENT OFFICE 2,118,496

FEEDING MECHANISM FOR SAWMILLS

Andrew J. Corley, Chattanooga, Tenn., assignor to Corley Manufacturing Company, Chattanooga, Tenn., a corporation of Tennessee Application March 9, 1936, Serial No. 67,855

3 Claims. (Cl. 74—220)

My invention relates to saw mills and more particularly to feeding mechanisms for reciprocating saw mill carriages which control the movement of logs carried by such carriages forward to and reverse of the moving saw.

It has been the practice in the prior art of variable feeding mechanisms, to provide a saw mandrel or arbor and a feed shaft secured to an appropriate husk frame, and to transmit power from the driven saw mandrel or arbor to the feed shaft by two sets of belts which act intermittently and separately upon the feed shaft, according to the will of the operator, to rotate it in either direction. Generally one belt set, comprising but a single belt, transmits power directly from the mandrel or arbor to the feed shaft, driving it in the same direction of rotation as the mandrel, while the other belt set, comprising one or more belts, transmits power from the mandrel or arbor to the feed shaft for rotating it in the opposite direction. When one belt is functioning the other is rendered inoperative for pulley means actuated by a lever means tightens one belt set about pulleys on the mandrel and feed shaft for rotation of such shaft in one direction or tightens the other belt set about other pulleys thereon for rotation in the opposite direction.

The actuating means has taken various forms but ordinarily is comprised of two pulleys, one for each belt set, rotatably secured in fixed relation to each other but movable with respect to its corresponding belt set. A lever secured thereto and acting in one direction urges one pulley into contact with its set for tightening it to operative condition and removes the other pulley from any operative contact with its corresponding set, and acting in the opposite direction, operatively tightens the other pulley with its corresponding belt set, and releases the first pulley.

It has been the practice to pivot the arm carrying such pulleys at the center and counterbalance the weight of the pulleys by a properly selected weight. The arm is moved about its pivot by a lever. This type of construction has a number of disadvantages, the principal among which are the necessity for carefully selecting an appropriate weight for counterbalancing, a heavy structure, and a relatively small lever advantage due to the length of the arm.

In addition to the above defects in the prior art, no means is provided for either apprising the operator of the neutral position of the lever or for positively maintaining it in such position when reached, thus rendering it likely at any moment that the carriage will move in either direction causing great injury to either human life or to timber and machinery.

Applicant with a knowledge of these defects in the prior art, has for an object of his invention the provision of a feeding mechanism employing only two belts, each controlled by one of two counter-balanced pulleys pivoted to an arm attached to the top of the husk frame.

It is a further object of my invention to provide a lever actuated feed control means which will give great lever advantage and conserve the strength and time of the operator.

A further object of my invention is to provide a neutral positioning means for said lever thereby greatly reducing injury to life, equipment and material due to faulty operation.

A still further object of my invention is to eliminate the necessity for a balancing weight with the space it occupies, and to provide counterbalanced pulleys actuated by means set in the vertical line of their pivot.

Other objects and advantages of my invention will appear in the following specification, and the novel features of the invention will be particularly pointed out in the annexed claims.

Figure 1 is a top plan view of a saw mill feed mechanism, disclosing my invention. Figure 2 is a side elevation, part of the husk frame being shown in section. Figure 3 shows a detail of the feed actuating pulleys and the neutral positioning means, partly in section. Figure 4 shows a detail of the feed actuating means as it is mounted on the husk frame.

In the drawing I designates the usual husk frame upon which are mounted, near the center, the bearings 3, 4 that carry the saw mandrel or arbor 2. Between the bearings 3, 4, and adjacent the bearing 3, are secured to the mandrel or arbor in close relation, two pulleys 5, 6. The smaller pulley, 6, is the advance or feed drive pulley, while the larger, 5, is the carriage return drive pulley. Adjacent one end of the husk frame is mounted the feed shaft 8 in the bearings 9, 10, and secured to the shaft intermediate the bearings 9, 10 is the carriage advance and return drive pulley 7. Mounted on one end of the shaft 8 is the pinion 23 which meshes with the gear 24, secured to the carriage drive shaft 25.

On the husk frame I intermediate the mandrel or arbor 2 and feed shaft 8 is the feed control means comprising pulleys 15, 16 mounted on shafts 17, 18 which shafts are secured to side frames 19, 20 by set screws 34, 35. 44 designates collars for limiting the movement of pulleys 15, 16 on their respective shafts. Each side frame is provided with a socket for the reception of stub shafts 32, 33 seated and held in brackets 21, 22 by set screws 41, 40, said brackets being in turn secured to husk frame 1 thereby serving as a mounting for the feed control means. Seated in each of the brackets 21, 22 and actuated by a spring 43 are the balls 42. Each ball engages and cooperates with a corresponding groove in the related side frame. In one of the side frames 19 and in the vertical line of the pivots 32, 33 is seated a connecting pin 37 held in place by a set screw 39, and positioned in the side frame 19 adjacent the pulleys 15, 16, and in the vertical line of the pivots 32, 33 is located the pin 36 secured in place by the set screw 38.

28, 29 designates bracket supports mounted on one end of the husk frame 1, and 27 designates a lever shaft bridging said supports. 26 represents a two-part hand lever mounted on the shaft 27 and moves the free end of the strap 31. Strap 31 ordinarily bridges the space between the arm 30 and pin 36, or it may be used alternatively to bridge the space between arm 30 and pin 37. When secured to pin 36 the handle 26 operates in one direction for forward movement of the carriage, and when secured to pin 37 it operates in the opposite direction.

On the opposite side of the husk frame 1 from the feed shaft and pulleys is a single idler pulley 11 mounted on brackets 13, 14 by a shaft 12.

The feeding mechanism is comprised of two sets of pulleys operated by two belt sets. The first set includes pulleys 5 and 7 joined by a belt engaged by pulley 15. The other set includes pulleys 6, 7, 11, and 16 and is rendered operative by pulley 16.

The operation is as follows:

Power equipment drives the mandrel or arbor 2 in a clockwise direction, but the carriage remains in its original position for lever 26 is maintained in neutral position by the engagement of balls 42 with their corresponding grooves in the side frames 19, 20. In this position both sets of belts are loose about their power transmission pulleys 5, 6 and there is no response from the carriage.

Taking the situation where strap 31 is secured to pin 36 (shown in solid lines in Figure 2), the operator moves the lever to the right (Figure 2), forcing the balls 42 out of their grooves and leaving the lever 26 free to move, tightens pulley 16 with its belt and causes power to be transmitted by pulley 6 to pulley 7, rotates it in a counter clockwise direction, and carriage drive shaft 25 in a clockwise direction, moving the carriage and log towards the saw. As the lever is moved farther to the right the carriage speed is increased by the belt tightening.

After the cut has been made the operator returns the lever 26 to neutral, and returns the carriage to its original position by moving the lever to the left. This action further loosens the second belt set engaging pulleys 6, 7, 11, and 16 and causes pulley 15 to engage and tighten its corresponding belt about the first belt set including pulleys 5, 7 and transmits power from pulley 5 to pulley 7 driving feed shaft in a clockwise direction, and carriage drive shaft 25 in a counter clockwise direction, returning the carriage to the original position. After this the lever is returned to neutral position where balls 42 engage their corresponding grooves in side frames 19, 20 and maintain the lever.

As the feed control means is mounted on the top of the husk frame 1, pulleys 15, 16 will be given a short pivot arm, will occupy but little space, and will cooperate with a short rocking lever 30, to give a great advantage for the hand lever 26, and render it easy to operate.

If it is desired to operate the feeding mechanism by moving the handle 26 in the opposite direction, strap 31 may be secured to pin 37 instead of pin 36 (as shown in solid lines in Figure 4).

The spring pressed detents 42, 43 serve a dual function. First, to apprise the operator that neutral position has been reached, and second to maintain the lever in such position until again moved by the operator.

Having thus described my invention, I claim:

1. A saw mill of the character described comprising a saw mandrel, a feed shaft, a pair of pulleys on said feed shaft, a pulley mounted on said mandrel, a belt leading therefrom to one of said pulleys on the feed shaft, a feed control means positioned intermediate the mandrel and feed shaft, a pulley mounted on said control means, the second pulley on said mandrel, a belt leading to the other of said pulleys on said feed shaft after passing over a pulley on the feed control means, and an idler pulley on the feed control means for driving the feed shaft in the opposite direction from the last named belt, and means acting upon the feed control means for moving one of the pulleys to tighten one belt for driving in one direction and the other for driving in the opposite direction, and spring detents normally acting directly on the feed control means to maintain it in normal position.

2. In a feed control mechanism for a saw mill, a husk frame, brackets mounted on said frame, members pivotally mounted on said brackets, a pair of shafts detachably joining said frames, pulleys rotatably mounted on said shafts, means for rocking said members about their pivots to cause said pulleys to alternately engage two belt sets and spring detent means seated in said brackets and cooperating with corresponding grooves in said members to normally maintain the pulleys in neutral position.

3. In a feed control mechanism for a saw mill, a husk frame, brackets mounted on said frame, a member pivotally secured to one of said brackets and a second member pivotally secured to the other of said brackets, shafts removably bridging the space between said members, pulleys rotatably mounted on said shafts and symmetrically spaced on each side of the pivots, and means acting directly on the feed control mechanism for rocking said pulleys alternately into operative position.

ANDREW J. CORLEY.